United States Patent [19]

Gingell

[11] 3,928,823

[45] Dec. 23, 1975

[54] CODE TRANSLATION ARRANGEMENT

[75] Inventor: Michael J. Gingell, Sawbridgeworth, England

[73] Assignee: International Standard Electric Corporation, New York,, N.Y.

[22] Filed: Aug. 22, 1974

[21] Appl. No.: 499,742

[30] Foreign Application Priority Data

Aug. 23, 1973 United Kingdom............... 39935/73

[52] U.S. Cl................ 332/11 R; 328/119; 328/167; 329/104; 340/146.1 AV

[51] Int. Cl.$^{2}$ ......................................... H03K 13/24

[58] Field of Search........ 329/1, 2, 104, 117; 332/1, 332/9 R, 9 T, 11 R; 340/347 DD, 146.1 AB, 146.1 AQ, 146.1 AV; 328/167, 119

[56] References Cited

UNITED STATES PATENTS

| | | | |
|---|---|---|---|
| 2,858,530 | 10/1958 | Kohs | 332/1 X |
| 2,876,418 | 3/1959 | Villars | 332/1 |
| 3,453,551 | 7/1969 | Häberle | 328/119 |
| 3,636,454 | 1/1972 | Pasternack et al. | 329/104 X |
| 3,639,848 | 2/1972 | Elliott | 328/119 X |
| 3,728,678 | 4/1973 | Tong | 340/146.1 AQ |

*Primary Examiner*—Alfred L. Brody
*Attorney, Agent, or Firm*—John T. O'Halloran; Menotti J. Lombardi, Jr.; Alfred C. Hill

[57] ABSTRACT

The translation arrangement translates a pulse density modulation binary signal to a conventional pulse code modulation binary signal. The arrangement includes a digital filter to which a pulse density modulated signal is applied and logic means coupled to the output of the digital filter, the logic means being arranged to select every mth group of n pulses in the digital filter output.

5 Claims, 5 Drawing Figures

CODE TRANSLATION ARRANGEMENT

BACKGROUND OF THE INVENTION

This invention relates to a translation arrangement to translate one type of code signal to a second type of code signal.

SUMMARY OF THE INVENTION

An object of this invention is to provide an electrical pulse density modulation (PDM) to pulse code modulation (PCM) translation arrangement.

A pulse density modulation code system is one in which the instantaneous amplitude of an analog input signal is represented by the ratio of '1's to '0's in a binary signal. Whereas in conventional PCM the output bit rate is fundamentally the product of the sampling rate and the number of bits per word, e.g. 64 KHz (kilohertz) for an 8-bit code with an 8 KHz sampling rate for a speech channel of 0 – 4 KHz, in a pulse density modulation system for the same channel a bit rate as high as 8 MHz (megahertz) may be considered necessary. However, it is possible to take such a high rate bit stream and process it to provide a pulse coded output the bit rate of which is comparable with conventional PCM systems.

A feature of the present invention is the provision of a pulse density modulation to pulse code modulation translation arrangement comprising: a source of pulse density modulated signal; a digital filter coupled to the source; and logic circuitry coupled to the digital filter, the logic circuitry selecting every mth group of n pulses in the output of the digital filter, where m and n are each integers greater than one.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 1:
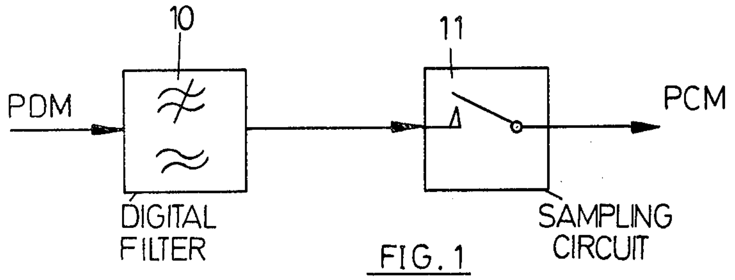
FIG. 1 is a block diagram illustrating a pulse density modulation to pulse code modulation translation arrangement in accordance with the principles of the present invention.

In the arrangement shown in FIG. 1 a pulse density modulated signal is applied to a digital filter 10 which is designed to suppress, as far as possible, high frequency noise. The filtered signal is then applied to a sampling circuit 11 which effectively selects every *m*th group of *n* pulses. For example, consider a system in which the PDM rate is 8.064 Mb/s (megabits per second). After filtering this can be regarded as an arbitrary stream of 14-bit words with a word rate of 8.064 Mw/s (megawords per second). If now every 504th 14-bit word is selected the output is a PCM signal of 16 Kw/s (kilowords per second). These figures provide a system suitable for use in current digital FDM (frequency division multiplex) telephony developments.

Figure 2:
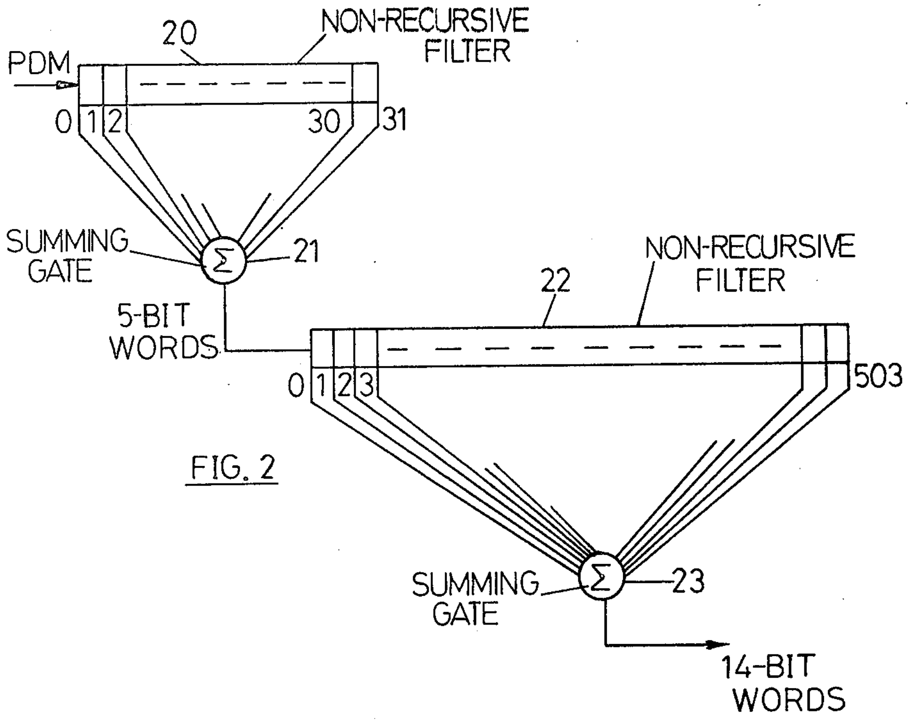
FIG. 2 is a block diagram of one embodiment of the digital filter utilized in the arrangement of FIG. 1.

The digital filter may be realized as a two-stage structure as shown in FIG. 2. Each stage is a separate non-recursive filter with unity tap gains. The first stage 20, to which the PDM signal is applied, has 32 sections. The outputs of all 32 sections are applied to a summing gate 21. The output of gate 21 is a data stream at the same word rate as the PDM input but one which is now in the form of 5 bit words. This output is then applied to the second stage 22 which is similar to the first stage but has 504 sections. Again the outputs from all the sections of the second stage are summed and the output from summing gate 23 is now a data stream having the same word rate as the PDM input but one which is now in the form of 14 bit words. It is this output which is applied to the sampling circuit 11 of FIG. 1, where every 504th 14-bit word is selected as the PCM output.

Figure 3:
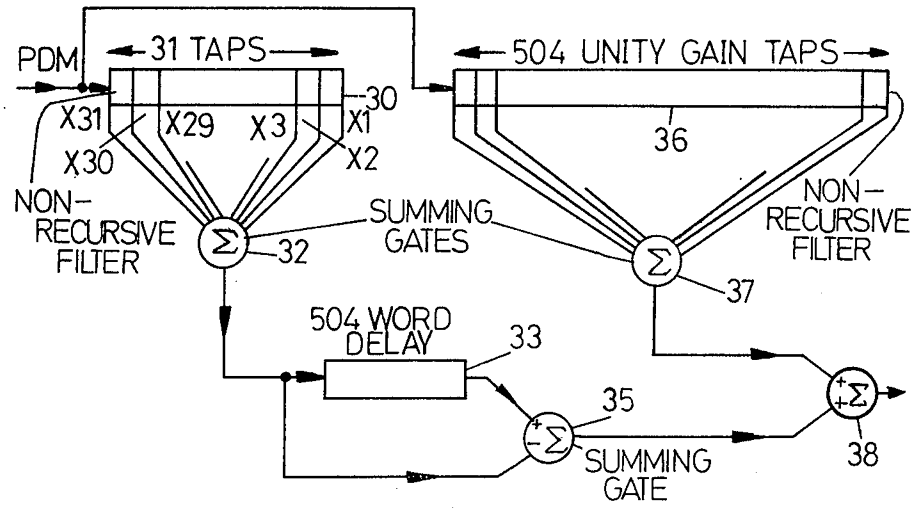
FIG. 3 is a block diagram of another embodiment of the digital filter utilized in the arrangement of FIG. 1.

An alternative form of filter structure is that shown in FIG. 3. Whereas in FIG. 2 the two stages were cascaded, in FIG. 3 they are in parallel. The first stage 30 has 31 taps, each of which have weighted gain, from unity gain at the last tap to ×31 gain at the first tap. The outputs from the taps are summed in summing gate 32 and the summed output is applied to a 504-word delay 33. The delayed output then has subtracted from it the undelayed output in summing gate 35. The second stage 36 has applied to it the PDM signal and has 504 unity gain taps, the outputs of which are summed in summing gate 37. The outputs of summing gates 35 and 37 are then summed in summing gate 38. The output of gate 38 is applied to the sampling circuit 11 of FIG. 1 as before. The arrrangement of FIG. 3 is such that an effective output is only taken from the first stage 30 once every 504 words, due to the introduction of the delay 33. The other 503 calculations are not required, so in a multiplexed system the first stage 30 could be time shared with other channels.

Figure 4:
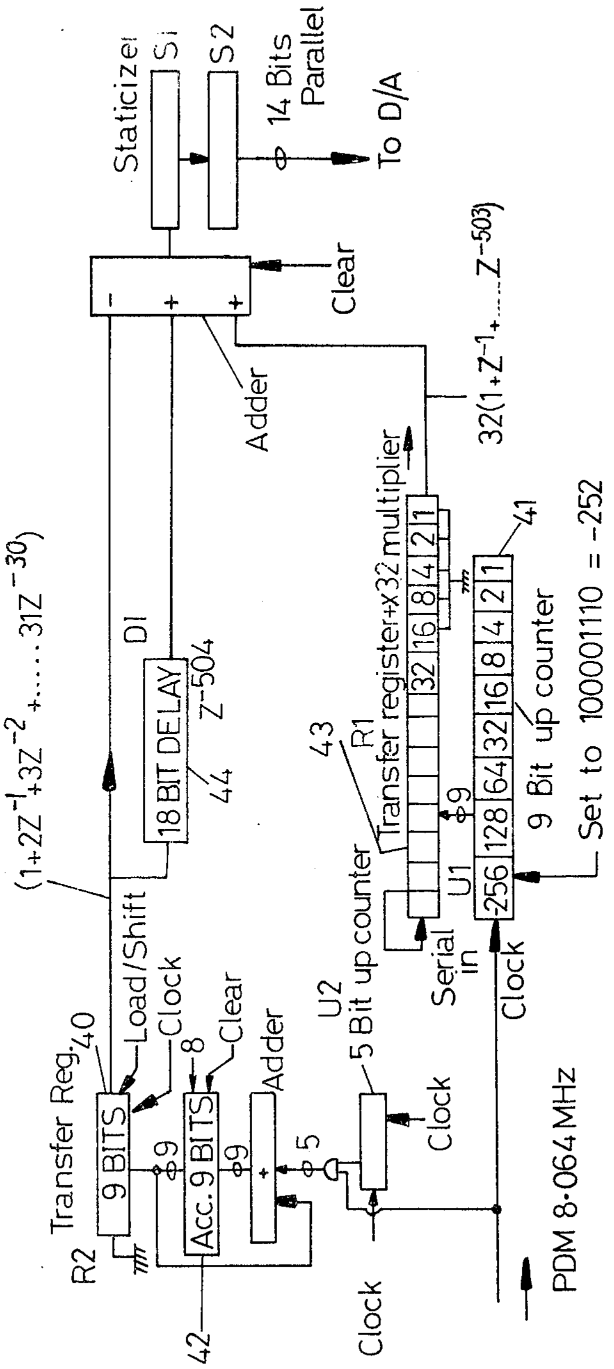
FIG. 4 is a logic diagram of a practical realization of the digital filter of FIG. 3.

FIG. 4 shows how the two stages of the filter of FIG. 3 can be realized in practice in terms of counters. The second stage 36 can be a simple 9-bit up-counter 41 which is cleared every 16 KHz period. At the end of such a period the counter contains the sum of the last 504 bits of the PDM signal and must be multiplied by 32 (i.e. shifted by 5 bits in register 43) to achieve the correct answer. The first stage 30 of the filter can be realized as a 5-bit up-counter with accumulator 42 which keeps adding the contents of the counter into a register 40 for a period of 31 bits. At the end of this period the first bit out of the PDM modulator will have been counted once, the second bit twice, the third bit three times and so on. The output from this is subtracted from the 9-bit up-counter together with the same output delayed by one 16 KHz period in delay 44. The result is a 14-bit PCM word at the 16 KHz rate.

In practical circumstances it is assumed that the PDM input bits are worth 0 or +1. This means that when, with no input signal, the PDM output is an idle 101010 . . . pattern then the translator will give out a fixed bias equal to 252 × 32 least significant bits. To offset this it would be advantageous to set the 9-bit up-counter 41 to −252 instead of clearing it. The counter remains as before except that the most significant bit is assigned the weight −256. The transfer register 43 must be modified so that the sign bit is propagated through to the extra bits if the word length is increased, say to 18 bits, for compatibility with certain FDM systems.

Figure 5:
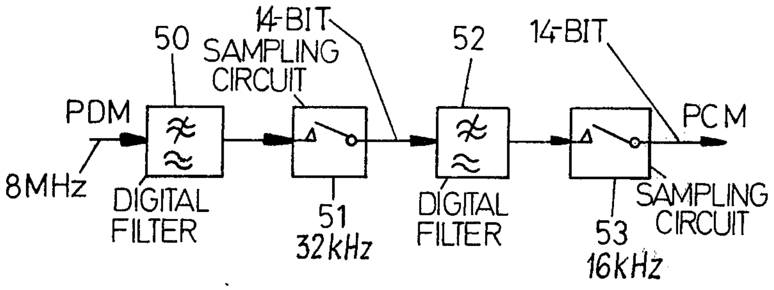
FIG. 5 is a block diagram of a modification of the arrangement of FIG. 1.

In a modification of the arrangement of FIG. 1, shown in FIG. 5, the digital filtering is divided into two stages. The PDM input is first digitally filtered by digital filter 50 to provide 14-bit words followed by sampling in sampling circuit 51 at 32 KHz. A second digital filtering process is then carried out by digital filter 52 followed by a second sampling by sampling circuit 53 at 16 KHz. This avoids the need for a costly low-pass LC (inductor-capacitor) filter in the analog input when the input signal contains components outside the required channel bandwidth, a cheaper RC (resistor-capacitor) filter being adequate.

While I have described above the principles of my invention in connection with specific apparatus it is to be clearly understood that this description is made only by way of example and not as a limitation of the scope of my invention as set forth in the objects thereof and in the accompanying claims.

I claim:

1. A pulse density modulation to pulse code modulation translation arrangement comprising:
- a source of pulse density modulated signal;
- a digital filter coupled to said source; and
- logic circuitry coupled to said digital filter, said logic circuitry selecting every *m*th group of *n* pulses in the output of said digital filter, where *m* and *n* are each integers greater than one;
  - said digital filter including
    - a first non-recursive multi-section filter stage having a plurality of unity gain taps, said first filter stage being coupled to said source,
    - a first summing gate coupled in common to all of said taps of said first filter stage,
    - a second non-recursive multi-section filter stage having a plurality of unity gain taps, said second filter stage being coupled to the output of said first gate, and
    - a second summing gate coupled in common to all of said taps of said second filter stage, the output of said second gate being coupled to said logic circuitry.

2. A pulse density modulation to pulse code modulation translation arrangement comprising:
- a source of pulse density modulated signal;
- a digital filter coupled to said source; and
- logic circuitry coupled to said digital filter, said logic circuitry selecting every *m*th group of *n* pulses in the output of said digital filter, where *m* and *n* are each integers greater than one;
- said digital filter including

- a first non-recursive multi-section filter stage having a plurality of taps with increasingly weighted gain from unity gain at a first of said taps, said first filter stage being coupled to said source,
- a first summing gate coupled in common to each of said taps of said first filter stage,
- a delay means coupled to the output of said first gate,
- a subtracting means coupled to the output of said delay means and the output of said first gate,
- a second non-recursive multi-section filter stage having a plurality of unity gain taps, said second filter stage being coupled to said source,
- a second summing gate coupled in common to each of said taps of said second filter stage, and
- a third summing gate coupled to the output of said second gate and said subtracting means to provide an output signal coupled to said logic circuitry.

3. An arrangement according to claim 2, wherein said first filter stage includes
- a clocked digital up-counter coupled to said source,
- a register, and
- an accumulator coupled between said clocked up-counter and said register to keep adding the contents of said clocked up-counter to said register in accordance with said pulse density modulated signal.

4. An arrangement according to claim 3, wherein said second filter stage includes
- an up-counter coupled to said source, said up-counter being incremented by said pulse density modulated signal,
- first means coupled to said up-counter to periodically clear said up-counter, and
- second means coupled to said up-counter to multiply the contents of said up-counter immediately prior to each clearing of said up-counter.

5. An arrangement according to claim 2, wherein said second filter stage includes
- an up-counter coupled to said source, said up-counter being incremented by said pulse density modulated signal,
- first means coupled to said up-counter to periodically clear said up-counter, and
- second means coupled to said up-counter to multiply the contents of said up-counter immediately prior to each clearing of said up-counter.

* * * * *